United States Patent [19]
Ko

[11] Patent Number: 5,444,679
[45] Date of Patent: Aug. 22, 1995

[54] OPTICAL DISK DRIVER FOR READING DATA FROM A DISK BASED ON ID INFORMATION

[75] Inventor: Seong-ro Ko, Suwon, Rep. of Korea

[73] Assignee: Samsung Electronics Co., Ltd., Kyungki, Rep. of Korea

[21] Appl. No.: 148,941

[22] Filed: Nov. 8, 1993

[30] Foreign Application Priority Data

Dec. 28, 1992 [KR] Rep. of Korea ............... 92-25764

[51] Int. Cl.[6] .................... G11B 17/22; G11B 7/00
[52] U.S. Cl. .................................. 369/32; 369/124; 369/44.28
[58] Field of Search ............... 369/32, 33, 13, 44.28, 369/47, 48, 124; 360/59, 114

[56] References Cited

U.S. PATENT DOCUMENTS

| | | | |
|---|---|---|---|
| 5,204,514 | 4/1993 | Horiguchi | 369/32 |
| 5,253,242 | 10/1993 | Satoh et al. | 369/32 |
| 5,293,568 | 3/1994 | Oshiba et al. | 369/32 |

FOREIGN PATENT DOCUMENTS

| | | | |
|---|---|---|---|
| 61-59673 | 3/1986 | Japan | 369/32 |
| 155744 | 3/1989 | Japan | 369/32 |
| 337833 | 2/1991 | Japan | 369/32 |

*Primary Examiner*—Georgia Y. Epps
*Assistant Examiner*—Tan Dinh
*Attorney, Agent, or Firm*—Lowe, Price, LeBlanc & Becker

[57] ABSTRACT

An optical disk driver of the present invention has a pickup for picking up the ID information and the data information recorded on a disk as a radio frequency signal, a demodulator for demodulating the radio frequency signal which is picked up by the pickup into a binarization signal, an interface controller for outputting an instruction signal corresponding to a target track number to be searched, a servo driver for transferring the pickup to the track that corresponds to the target track number, an ID reading circuit which reads ID information indicating the track location from output data from the demodulator, and a micro-computer for outputting a driving signal to the servo driver so as to transfer the pickup to the track that corresponds to the target track number, and for determining whether the ID information from the ID reading circuit corresponds to the target track and outputting an operation-completed signal to the interface controller if the ID reading circuit does correspond to the target track. Thus, track searching time is reduced as the instruction sending-/receiving between the interface controller and servo is simplified.

6 Claims, 8 Drawing Sheets

OPTICAL DISK DRIVER FOR READING DATA FROM A DISK BASED ON ID INFORMATION

BACKGROUND OF THE INVENTION

The present invention relates to a magneto-optical disk driver and method thereof which searches a desired track and embodies the identification (ID) information recorded on a disk to be read using a hardware, and then performs a correct search for a target track based on this ID data, for application to information storage systems.

Generally, an information storage system is a device which records information on such recording media as magnetic tape or optical disks, and reproduces the information recorded thereon.

For such an information storage system, when the target track is searched in a conventional magneto-optical disk driver (MODD), the method for reading the identification (ID) information, which represents such track information as the track number, sector number and cyclic redundancy check (CRC) code, will be explained referring to both FIG. 1 and FIG. 2.

Figure 1:
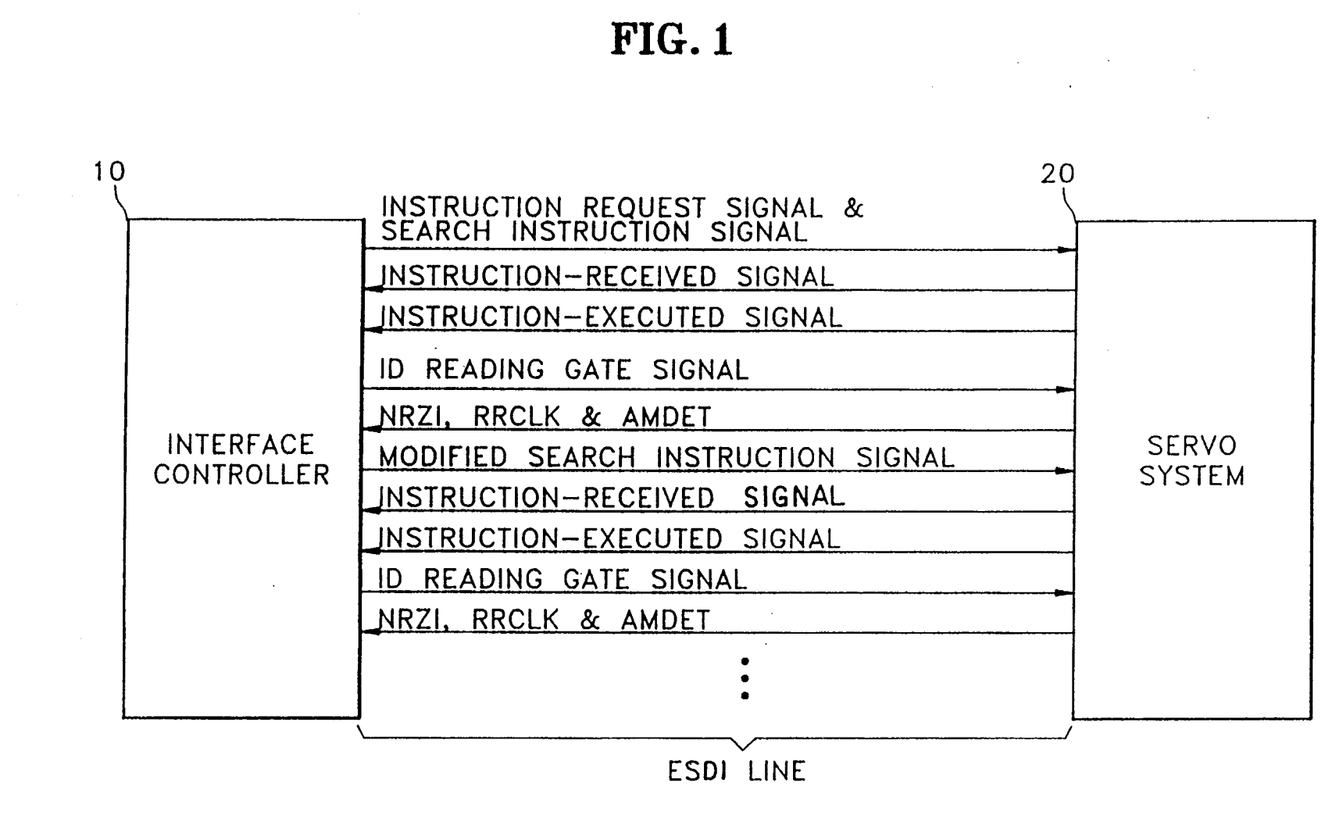
FIG. 1 is to explain the control of the servo system of the conventional optical disk driver.

Referring to FIG. 1, first, an interface controller 10 sends to a servo system 20 an instruction request signal and search instruction signal which together result in a proper transfer of an optical pickup to the target track. Then, servo system 20 transfers to interface controller 10 an instruction-received signal and an instruction-executed signal which together signify that the transfer of the desired track has been completed (steps S1–S4).

Then, interface controller 10 activates a read gate signal so as to read the ID data, and then analyzes a non-return-to-zero inverse (NRZI) signal, a read reference clock (RRCLK) signal, and an address mark detected (AMDET) signal from data demodulation means (not shown) which consists of a phase-locked loop (PLL) and an encoder. Interface controller 10, then determines whether the track is the desired one (steps S5–S8).

Next, if it is the desired track, interface controller 10 reads the ID data corresponding to the desired one and outputs an indication that the desired track has been reached, and if not, the interface controller 10 repeatedly transmits to servo system 20 a modified search instruction signal for performing a re-transfer operation by a difference value. When the instruction-received signal is received from servo system 20, interface controller 10 analyzes the NRZI, RRCLK and AMDET signals by re-operating the ID reading gate, and then determines whether the searched track is the desired one (steps S8–S12).

Figure 2:
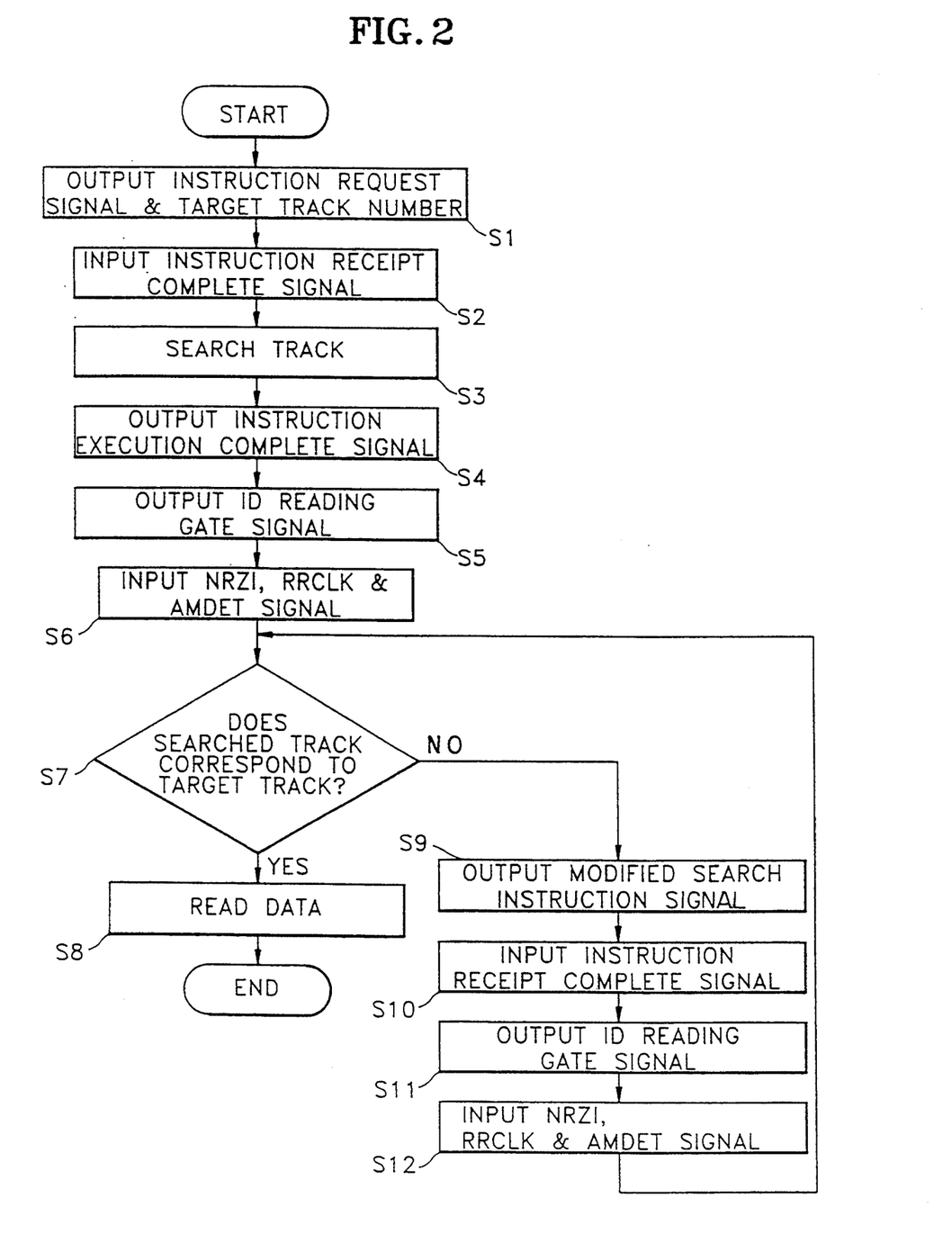
FIG. 2 is a flowchart to explain the track searching method which is performed in the interface controller shown in FIG. 1.

Here, steps S1 to S12 of FIG. 2 are performed in interface controller 10 which connects to a host personal computer and optical disk driver.

As above, since all of the instructions are transmitted as serial data through the enhancement small device interface (ESDI) command line by the operation of interface controller 10 and servo system 20, a long time is required for the transmission. Also, several repeated executions of the instructions are necessary for searching the desired track, which further defers the searching time for the entire system.

SUMMARY OF THE INVENTION

To overcome the problems as described above, it is an object of the present invention to provide an optical disk driver and method thereof which searches the desired track and embodies ID information recorded on a disk to be read using a hardware, and performs a correct track search based oil this ID data.

It is another object of the present invention to provide an optical disk driver and method thereof which searches the desired track and embodies ID information recorded oil a disk to be read using a hardware, and searches the track based oil this ID data, to thereby reduce searching time.

To accomplish the above objects, there is provided an optical disk driver of the present invention having pickup means for picking tip the ID information and the data information recorded on a disk as a radio frequency signal and demodulation means for demodulating the radio frequency signal which is picked tip by the pickup means into a binarization signal, the optical disk driver comprising:

an interface controller for outputting an instruction signal corresponding to a target track number to be searched:

track transfer means for transferring the pickup means to the track that corresponds to the target track number;

an ID reading circuit which reads ID information indicating the track location from output data from the demodulation means: and control means for outputting a driving signal to the track transfer means so as to transfer the pickup means to the track that corresponds to the target track number, and for determining whether the ID information from the ID reading circuit is corresponds to the target track and outputting an operation-completed signal to the interface controller if the ID reading circuit does correspond to the target track.

Further, an optical disk driving method having pickup means for picking up ID data, recorded on an optical disk and then searches a desired track using the ID data, comprises the steps of:

inputting a target track number:

transferring the above pickup means to the target track by responding to the target track number:

reading the ID data after transferring the above pickup means to the target track;

determining whether the transferred track of the read ID data is the target track; and if the transferred track is the target track, completing the search, and if not, feeding back to the optical disc transferring step.

Accordingly, if the desired track number is informed to servo system, the interface controller adapted to the present invention detects ID recorded on disk, by the ID reading circuit which is embodied in hardware until the desired track is searched, and then stops the transfer when transferred up to the target track, and then transmits the instruction execution complete signal and searched track number to interface controller, which results in the reduction of searching time and the correct track search.

BRIEF DESCRIPTION OF THE DRAWINGS

FIG. 7A to FIG. 7D constitute waveform charts of signals associated with the ID reading circuit shown in FIG. 6.

DETAILED DESCRIPTION OF THE INVENTION

The above objects and other advantages of the present invention will become more apparent by describing a preferred embodiment in more detail with reference to the attached drawings.

Figure 3:
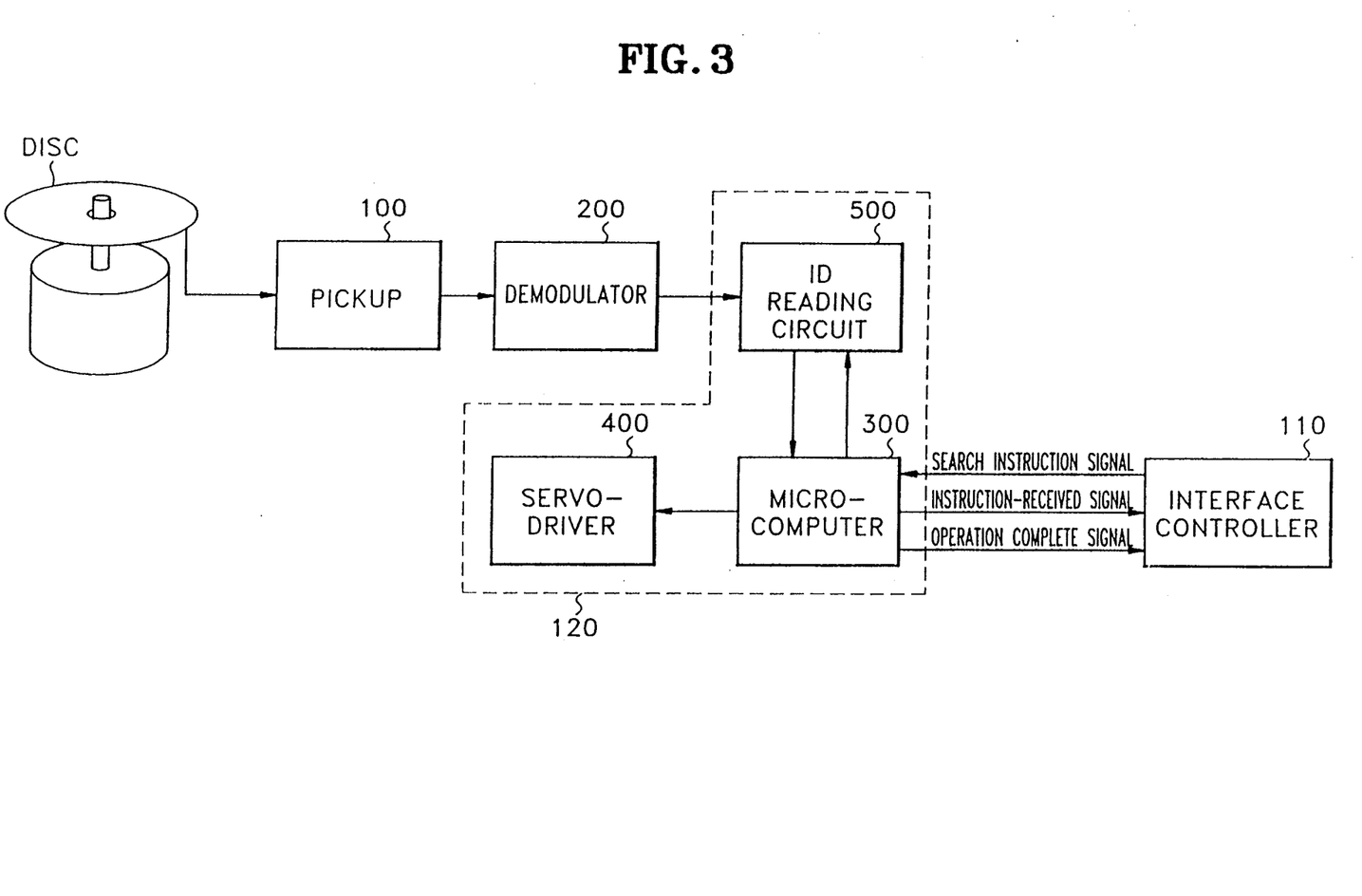
FIG. 3 is a block diagram according to an embodiment of the optical disk driver of the present invention.

Referring to FIG. 3, the optical disk driver of the present invention comprises a pickup 100 which picks up the data recorded on the optical disk as a radio frequency signal, a demodulator 200 which consists of a PLL and an encoder so as to demodulate the data picked up by pickup 100 into a binarization signal, an interface controller 110 which outputs the instruction signal relevant to the desired search track number, a servo driver 400 which drives a focusing servo and tracking servo so as to transfer the pickup 100 to the track corresponding to the target track number to be searched, an ID reading circuit 500 which detects ID information indicating the location of the track from the output data of demodulator 200, and a microcomputer 300 which outputs a driving signal to servo driver 400 so as to transfer pickup 100 to the track corresponding to the instruction signal which corresponds to the target track number, and determines whether the ID information output from ID reading circuit 500 is for the target track, and if so, outputs an operation-completed signal to interface controller 110.

Here, servo system 120 consists of microcomputer 300, servo driver 400 and ID reading circuit 500.

Figure 4:
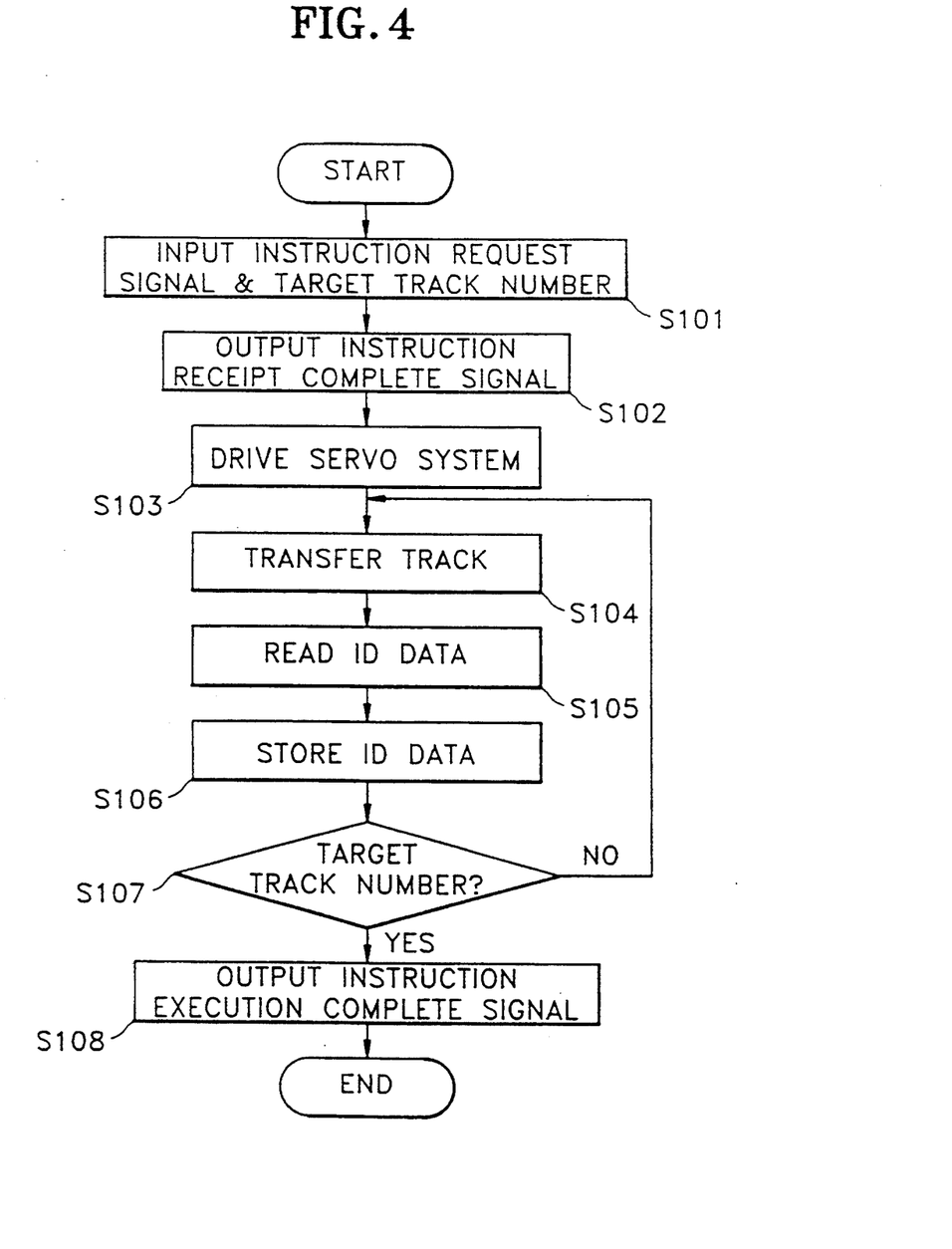
FIG. 4 is a flowchart to explain the track searching method which is performed in the microcomputer shown in FIG. 3.

FIG. 4 is a flowchart to explain the track search method performed in microcomputer shown in FIG. 3.

Referring FIG. 4, steps S101 and S102 are the input steps of a target track number, steps S103 and S104 are track transfer steps, steps S105 and S106 are ID reading steps, step S107 is a determining step, and step S108 is search-completing step.

The operation of the optical disk driver shown in FIG. 3 will be explained in connection with FIG. 4.

Referring to FIG. 3, if the desired track (target track) number is input to microcomputer 300 of servo system 120, interface controller 110 controls servo driver 400 until the desired track is searched and then drives a focusing servo and a tracking servo so as to transfer pickup 100 to the target track (steps S101–S104).

Track information based on the output data from demodulator 200 is read in ID reading circuit 500, and then is transferred to microcomputer 300. Interface controller 110 stops the transfer when the target track as determined by the interface controller has been reached. Then, an execution-completing signal and the searched track number is input to interface controller 110 (steps S105–S108).

Figure 5:
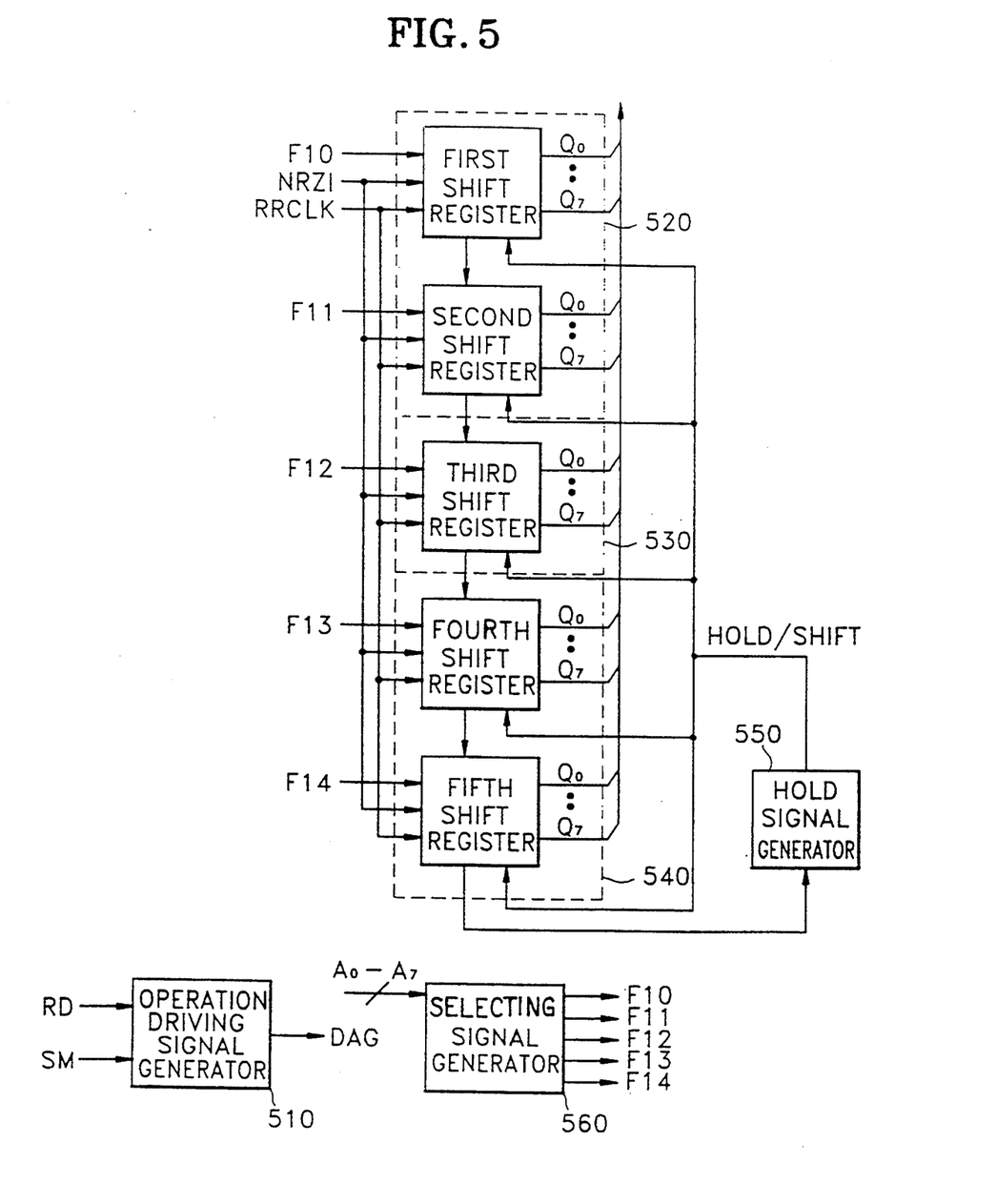
FIG. 5 is a block diagram of the ID reading circuit shown in FIG. 3.

FIG. 5 is a block diagram of the ID reading circuit shown in FIG. 3.

Referring to FIG. 5, the ID reading circuit comprises an operation driving signal generator 5 10 which detects a data read gate signal which drives the ID reading circuit after the sector mark (SM) signal is generated, a track number detector 520 which inputs a binarization signal (i.e., the NRZI signal from demodulator 200) and then detects a track number according to the RRCLK, a sector number detector 530 which inputs the NRZI signal from demodulator 200 and then detects a sector number according to the RRCLK, an error correction signal detector 540 which inputs the NRZI signal from demodulator 200 and then detects a cyclic redundancy check code (CRC1 and CRC2), a hold signal generator 550 which inhibits the RRCLK so that 40-bit data is held in track number detector 520, sector number detector 530, and error correction signal detector 540 without shifting the 40-bit data when exactly latched therein, and a selecting control signal generator 560 which outputs a selecting control signal for serially inputting to microcomputer 300 the out,puts of track number detector 520, sector number detector 530 and error correction signal detector 540.

Track number detector 520, sector number detector 530 and error correction signal 540 are constituted by shift registers for storing all 40 bits therein. A first and a second shift register 521 and 522 of track number detector 520 store an 8-bit track "high" byte and an 8-bit track "low" byte, and a third shift register of sector number detector 530 stores an 8-bit sector byte. Also, an error correction signal detector 540 stores a first and a second error correction signal (CRC1 and CRC2) of eight bits in fourth and fifth shift registers 541 and 542, respectively. Here, the track "high" byte and track "low" byte represent the track number, the sector byte represents the sector number of a track, and the CRC1 and CRC2 are the CRC-check data which checks the accuracy of the track and sector number data.

Figure 6:
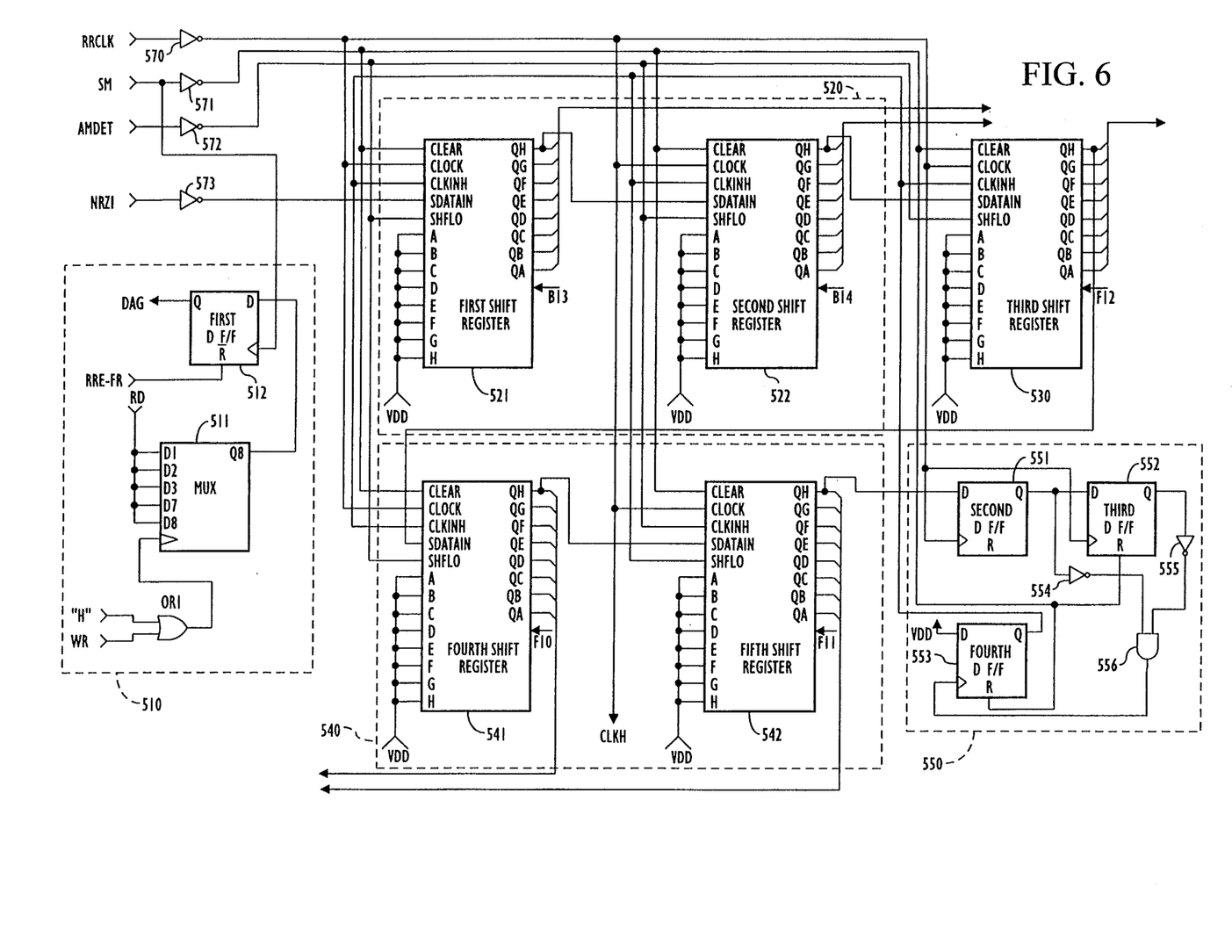
FIG. 6 is a detailed circuit diagram of the ID reading circuit shown in FIG. 5.

FIG. 6 is a detailed circuit diagram of the ID reading circuit shown in FIG. 5.

The operation of the ID read circuit of FIG. 6 will be explained in connection with the timing diagrams of FIGS. 7A–7D and FIGS. 8A–8U.

In the searching operation, servo driver 400 is driven under the control of microcomputer 300 when the desired track number is input from interface controller 110 of FIG. 3. From microcomputer 300, a write control signal (WR) and a logic "high" control signal (H) are input to an OR gate (OR1) whose output is supplied to multiplexer 511 as a clock signal. Multiplexer 511 operates only for the reading operation.

A read control signal (RD) is input to the input terminals D1, D2, D3, D7 and D8 of multiplexer 511 while the read signal output from the output terminal Q8 is input to the input terminal D of a first D-flip flop 512.

Figures 7A, 7B, 7C:
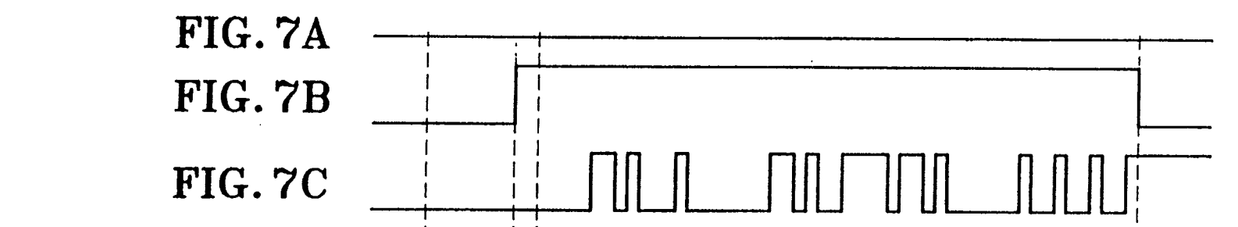

First D-flip flop 512 operates when a logic "low" SM signal is input, as shown in FIG. 7A, and delays the output signal of multiplexer 511 which is input to the above input terminal D. Then, the data read gate (DRG) signal is output so as to achieve an actual ID reading operation.

At this time, if the encoded signal controlled by the phase-locked loop is input from demodulator 200, then the AMDET signal recorded on the optical disk is detected and the signal of FIG. 7B is generated.

Figure 7D:
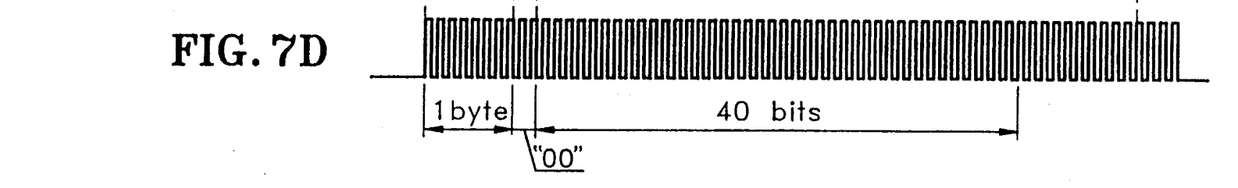
Figures 8A, 8B:
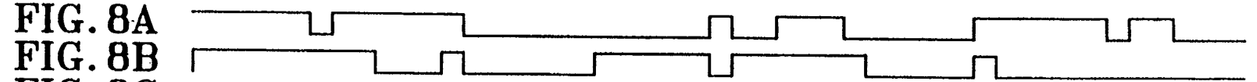
FIG. 8A to FIG. 8U constitute an operational timing diagram of the ID reading circuit shown in FIG. 5 or FIG. 6.
Figures 8C, 8D, 8E:
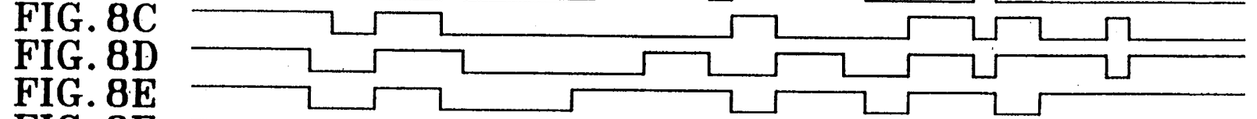
Figures 8F, 8G:
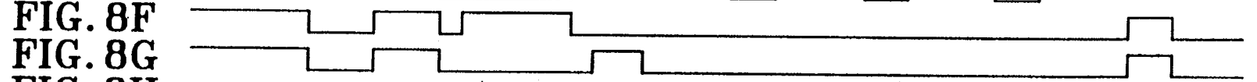
Figures 8H, 8I:
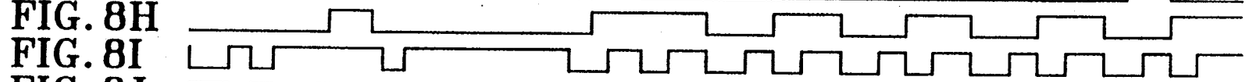
Figures 8J, 8K, 8L:
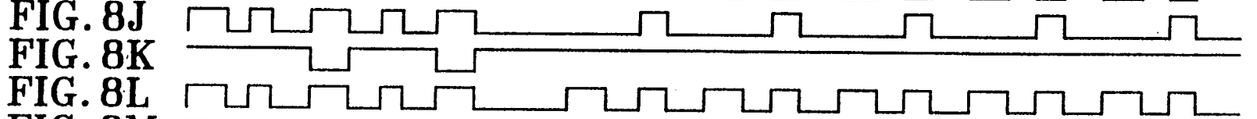
Figures 8M, 8N:
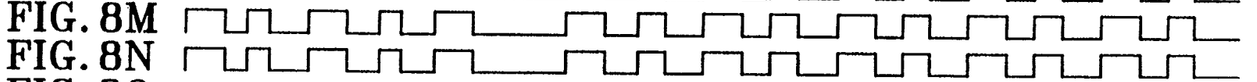
Figures 8O, 8P:
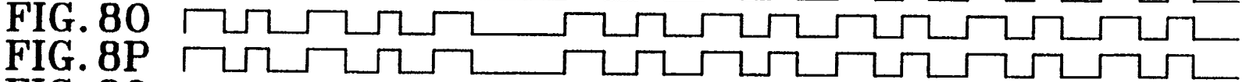
Figures 8Q, 8R:
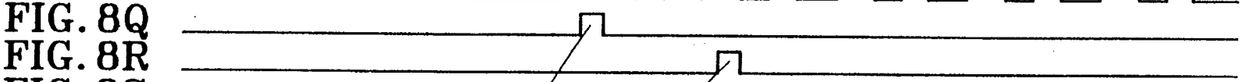
Figures 8S, 8T, 8U:
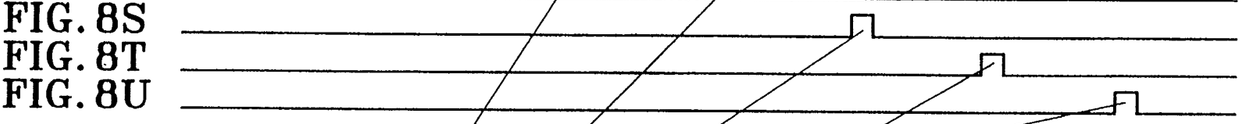

From this moment, a demodulated ID number is output with the RRCLK as shown in FIG. 7D. First, one byte of logic zeros is output as shown in FIG. 7C and then the 40 bits of the ID number after "00" are output. Therefore, when the output information is latched after 42 clock pulses, this value is the ID number.

In more detail, when the AMDET signal of FIG. 7B is input to the respective shift/load (SHFLO) terminals of first to fifth shift registers 521, 522, 530, 541 and 542, these shift registers load a "high" logic level until the AMDET signal goes high, and the NRZI signal is shifted to the serial data input terminal (SDATAIN) by the RRCLK (FIG. 7D) when the AMDET signal goes from "low" to "high."

The 40 bits from "00" (coming after one byte) is shifted into first to fifth shift registers 521, 522, 530, 541 and 542, and is then recognized by a second and a third D-flip flop 551 and 552. Also, a fourth D-flip flop 553 operates as the output of an AND gate (AND1) goes high, whereby the output is input to clock inhibit (CLKINH) terminal of first to fifth shift registers 521, 522, 530, 541 and 542, to thereby maintain the current value.

At this time, the output of a fourth D-flip flop 553, i.e., a signal for inhibiting the RRCLK, is input to microcomputer 300 so as to inform that the ID data is latched. Then, microcomputer 300 outputs a first to fifth selecting control signal F10–F14.

In accordance with this selecting control signal (F10–F14), the track number is read from first and second shift registers 521 and 522, the sector number is read from third shift register 530, and the CRC1 and CRC2 are read from fourth and fifth shift registers 541 and 542, respectively. If the CRC check is performed through the above process, the accuracy of the data can be determined.

When the disk spins at high speed, since the ID data cannot be read by every sectors, the read gate (RG) signal is activated only at the pre-formatted location of a preset sector by combining the pre-format (PRE-FR) signal and the sector marking (SM) signal and then, the ID data is read. After this, when the new sector mark is input, then the latched data is cleared and then shifted into first to fifth shift registers 521, 522, 530, 541 and 542 until the AMDET signal is detected.

When the ID reading operation is finished, the read gate signal of first D-flip flop 512 goes "low", to thereby prevent the read gate signal from being activated.

To summarize, when the NRZI signal is input from demodulator 200 as shown in FIG. 8A to FIG. 8H, selecting signal generator 360 inputs an 8-bit address signal as shown in FIG. 8I to FIG. 8P so as to generate the selecting control signals F10–F14 as shown in FIG. 8Q to FIG. 8U, and microcomputer 300 sequentially selects the outputs of first to fifth shift registers 521, 522, 530, 541 and 542.

For example, when the F10 signal (FIG. 8Q) is generated, the NRZI signal latched in first shift register 521 is "D1" (hexadecimal), when the F11 signal (FIG. 8R) is generated, the signal latched in second shift register 522 is a hexadecimal "06," and when the F12 signal (FIG. 8S) is generated, the signal latched in third shift register 530 is a hexadecimal "00." Accordingly, the hexadecimal value "D106" is recognized in microcomputer 300 so as to show the current track number, and the hexadecimal value "00" is recognized to show the current sector number.

As described above, in the optical disk driver apparatus and method thereof according to the present invention, the instruction sending/receiving between an interface controller and servo is simplified, as the sending-/receiving time is reduced.

Additionally, in the present invention, merely a servo circuit and an ID reading circuit embodied by a hardware enables ID reading. Therefore, by confirming the track number, off-track transfers and collisions with the main base can be prevented in track searching operations, to thereby promote accurate track searching.

What is claimed is:

1. An optical disk driver having pickup means for picking up the ID information and the data information recorded on a disk as a radio frequency signal and demodulation means for demodulating the radio frequency signal which is picked up by said pickup means into a binarization signal, said optical disk driver comprising:

an interface controller for outputting an instruction signal corresponding to a target track number to be searched;

track transfer means for transferring said pickup means to the track that corresponds to said target track number;

an ID reading circuit which reads ID information indicating the track location from output data from said demodulation means; and control means for outputting a driving signal to said track transfer means so as to transfer said pickup means to the track that corresponds to said target track number, and for determining whether the ID information from said ID reading circuit corresponds to the target track and outputting an operation-completed signal to said interface controller if said ID reading circuit does correspond to the target track, wherein said ID reading circuit comprises:

an operation driving signal generator which generates a read gate signal which activates said ID reading circuit when the sector mark signal recorded on said disk is detected;

a track number detector which inputs said binarization signal generated from said demodulation means and generates a track number;

a sector number detector which inputs said binarization signal generated from said demodulation means and detects a sector number;

an error correction signal detector which inputs said binarization signal generated from said demodulation means and detects an error correction signal;

a hold signal generator which generates a hold signal so as to hold a track number, sector number, error correction signal when these are detected from said track number detector, sector number detector and error correction signal detector, respectively; and a selecting control signal generator which generates a selecting control signal which controls the outputs of said track number detector, sector number detector and error correction signal detector so as to be serially input to said control means.

2. An optical disk driver according to claim 1, wherein said operation driving signal generator comprises:

a multiplexer which outputs a read signal under the control of said control means; and a delay element which delays the output of said multiplexer and outputs said read gate signal when said sector mark signal is detected.

3. An optical disk driver according to claim 2, wherein said track signal detector is constituted by shift registers which latch said track number.

4. An optical disk driver according to claim 3, wherein said sector signal detector is constituted by shift registers which latch said sector number.

5. An optical disk driver according to claim 4, wherein said error correction signal detector is constituted by shift registers which latch said error correction signal.

6. An optical disk driver according to claim 5, wherein said hold signal generator consists of a D-flip flop which outputs a control signal for inhibiting a clock from being input to said shift registers when the track number, sector number and error correction signal are correctly latched in said shift registers.

* * * * *